United States Patent [19]

Shiga

[11] 4,241,364
[45] Dec. 23, 1980

[54] PROGRAM-SELECTING DEVICE IN A REPRODUCING APPARATUS

[75] Inventor: Takashi Shiga, Tokyo, Japan

[73] Assignee: Victor Company of Japan Limited, Yokohama, Japan

[21] Appl. No.: 42,908

[22] Filed: May 29, 1979

[30] Foreign Application Priority Data

May 29, 1978 [JP] Japan .................................. 53/63363

[51] Int. Cl.³ ............................................ G11B 15/18
[52] U.S. Cl. .................................... 360/72.1; 360/137
[58] Field of Search ...................... 360/72.1, 72.2, 137

[56] References Cited

U.S. PATENT DOCUMENTS

| 2,944,116 | 7/1960 | Vershoven | 360/72.2 |
| 3,541,271 | 11/1970 | Joslow et al. | 360/72.1 |

Primary Examiner—Robert S. Tupper
Attorney, Agent, or Firm—Haseltine, Lake & Waters

[57] ABSTRACT

A program-selecting device is used for a reproducing apparatus for reproducing at fast-forward speed or normal speed a recording medium on which a plurality of programs are respectively and distinctively recorded. The program-selecting device comprises a switch for program number selection which is manipulatively operated a number of times corresponding to the number of programs to be skipped over to reach the desired program, a memory circuit for storing the number of times the switch is thus operated, a counting circuit for detecting the parts between adjacent programs from the signal reproduced at fast-forward speed from the recording medium thereby to count the number of programs skipped over at fast-forward speed, a comparison circuit for producing as output a coincidence signal when the output of the memory circuit and the output of the counting circuit coincide, a mechanism for operating in response to said coincidence signal to change the fast-forward reproducing mode of the recording medium of the reproducing apparatus over to the normal reproducing mode, a display part comprising a set of display elements provided in a plural number correspondingly respectively to the number of program numbers which can be selected, the display element corresponding to the program number of the selected program being lit, and a lighting circuit activating the display elements corresponding to the counted skipped over program to lite such in a mode different from the mode in which the display element corresponding to the selected program number is lit.

6 Claims, 4 Drawing Figures

PROGRAM-SELECTING DEVICE IN A REPRODUCING APPARATUS

BACKGROUND OF THE INVENTION

The present invention relates generally to devices for selecting, for reproduction, one of recorded program signals in reproducing apparatuses. More particularly, the invention relates to a device for selecting programs such as musical pieces or tunes, (hereinafter referred to as program-selecting device) which, in an apparatus for reproducing a magnetic tape on which is recorded a plurality of programs or items of programs (hereinafter referred to simply as program or programs), is first operated to select a program which is desired for reproducing and then causes the magnetic tape to travel at fast-forward speed up to the selected desired program and then the apparatus to carry out normal reproduction of the desired program and the succeeding programs, these operations, moreover, being indicated by visual display.

In general, a magnetic tape to be reproduced by a reproducing apparatus having a program-selecting device has, recorded thereon, a plurality of programs with unrecorded parts left in interposed state between adjacent programs. Then, a program-selecting device, in general, is adapted to count these unrecorded parts thereby to inumerate the number of programs (program numbers).

For example, in a known program-selecting device, there are provided setting switches of a number corresponding to the number of programs recorded on the magnetic tape. When it is desired to reproduce a certain program, the switch of the number corresponding to the program number of that desired program is manipulated and set. Then, as the magnetic tape is driven at fast-forward speed, the number of the unrecorded parts thereof between the programs is counted. At the instant when this counted number coincides with the number of the above mentioned set switch, the travel of the magnetic tape is changed over from fast-forward to normal speed, and normal reproduction is carried out at this normal speed.

In this known program-selecting device, however, a large number of program-selection switches corresponding to the number of programs the reproduction of which may possibly be desired must be provided. For this reason, the organization of the device is complicated, and a large space for the program-selection switches is required on the front panel of the reproducing apparatus. In addition, there are further problems such as the large number of parts and high production cost.

Furthermore, in the indicating display means of the known program-selecting device, elements (such as lamps or light-emitting diodes) for displaying the selected program numbers of selected programs and elements for displaying the tape positions (program positions) of the tape undergoing fast-forward travel are provided, respectively, in numbers corresponding to the maximum number of programs. Consequently, display elements of a number which is twice the maximum number of programs to be displayed have been necessary in the known device. This necessity also compounds the problems such as a large number of parts, high production cost, and requirement for large space for the display elements on the front control panel of the reproducing apparatus.

SUMMARY OF THE INVENTION

Accordingly, it is a general object of the present invention to provide, in a reproducing apparatus, a novel and useful program-selecting device in which the above described problems of the prior art have been overcome.

Another and specific object of the invention is to provide, in a reproducing apparatus, a program-selecting device in which the display of the number of the program selected for start of reproduction and the display of the position of the tape undergoing fast-forward travel up to arrival at the selected program number can both be accomplished by a single group of display elements. By this feature of the device of the present invention, a small number of display elements suffices. Furthermore, the production cost is relatively low, and only a small space is required for the display means.

Still another object of the invention is to provide a program-selecting device in a reproducing apparatus, in which device the display of the above mentioned selected program number and the display of the position of the tape undergoing its fast-forward travel up to that selected program number are carried out in respectively different modes of display. By this feature of the device of the invention, the selected program and the position of the tape undergoing fast-forward travel can be respectively displayed in a manner clearly separate and distinguishable from each other, whereby the operator cannot make an error in reading.

Other objects and further features of the invention will be apparent from the following detailed description with respect to preferred embodiments of the invention when read in conjunction with the accompanying drawings.

DETAILED DESCRIPTION

Figure 1:
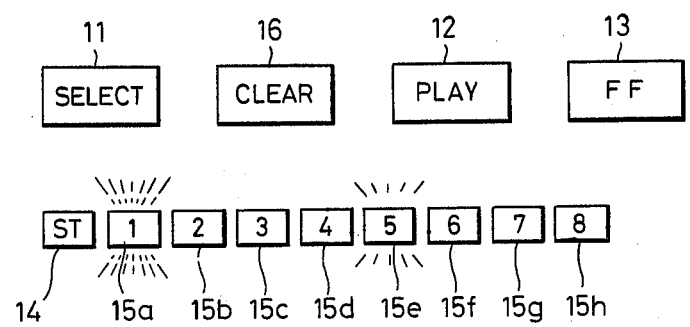
FIG. 1 is a front elevation showing a part of the front panel of an example of a reproducing apparatus in which the program-selecting device of the invention is applied.

The manner in which a reproducing apparatus in which the program-selecting device of the present invention is applied and the device are operated will first be described. First, a tape cassette (not shown in the drawings) containing a magnetic tape on which a plurality of programs are recorded in succession with unrecorded parts left between adjacent programs is loaded into the reproducing apparatus. Then, in accordance with a desired program whose reproduction is to be started, the quantitative number of programs to be skipped over by fast-forward tape travel without reproduction up to the desired program is selected. For this selection, the "SELECT" button 11 shown in FIG. 1 is pushed a number of times corresponding to the above mentioned number of programs to be skipped over.

Figure 2:
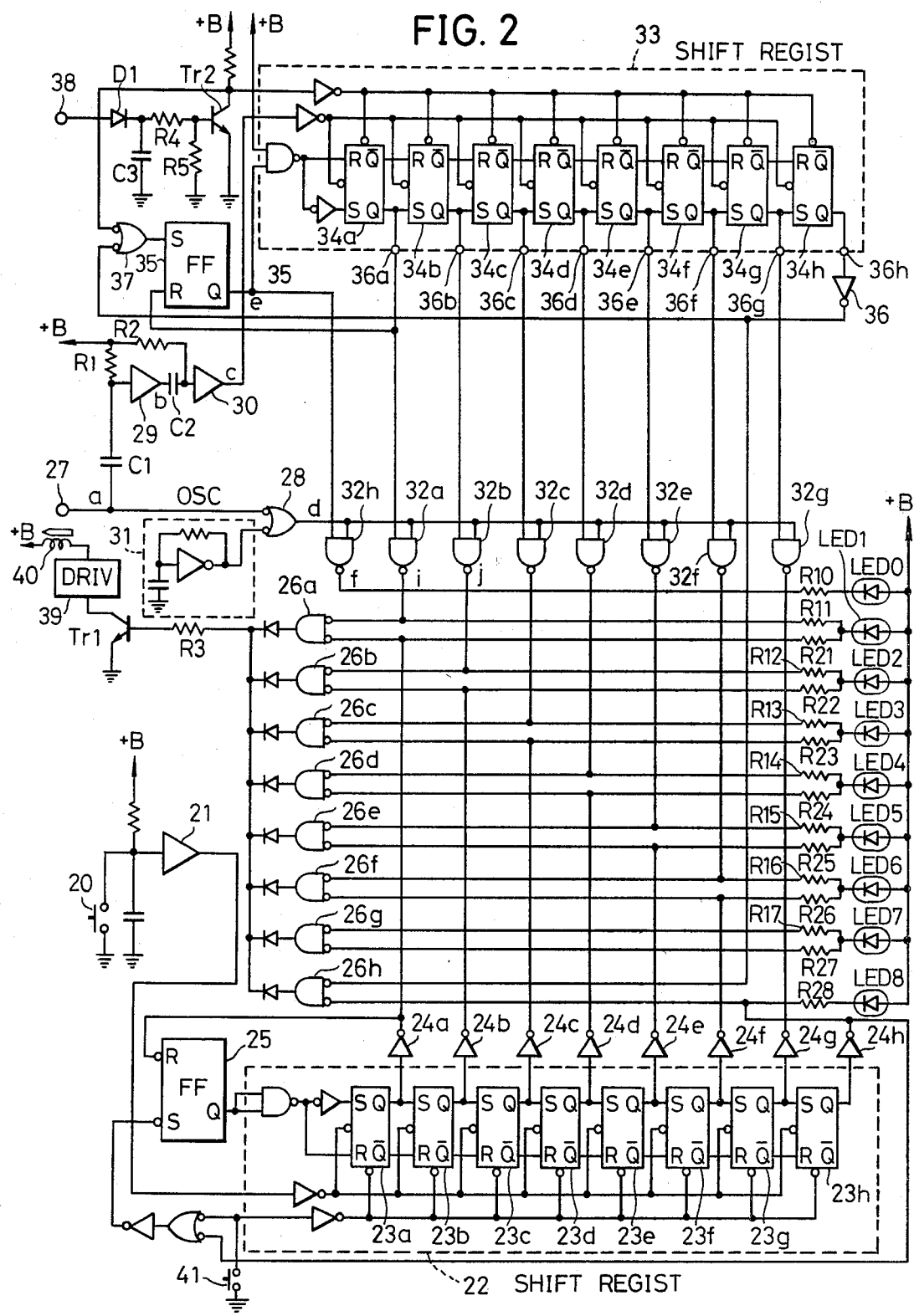
FIG. 2 is a circuit system diagram of one embodiment of the program-selecting device according to the invention.

Every time the "SELECT" button 11 is pushed, a switch 20 of the circuit shown in FIG. 2 is closed once. Every time the switch 20 is closed, one negative-polarity pulse is sent through a schmitt trigger circuit 21 for preventing chattering and applied as a clock pulse to a shift register 22. This shift register 22 comprises cascade-connected reset-set (RS) flip-flops 23a through 23h. Every time a clock pulse is thus applied to this shift register 22, the RS flip-flop producing a Q output is shifted from one flip-flop to a succeeding flip-flop from 23a to 23b, and so forth. More specifically, when the switch 20 is closed once, and one clock pulse is fed to the shift register 22, a Q output is produced from only the RS flip-flop 23a, and only the output of an inverter 24a associated with the RS flip-flop 23 assumes a low (L-) level. At this time, an RS flip-flop 25 is reset. The outputs of inverters 24b through 24h associated respectively with the RS flip-flops 23b through 23h are at a high (H-) level. Next, the switch 20 is again closed, and the succeeding one clock pulse is fed to the shift register 22, whereupon a Q output is produced from only the RS flip-flop 23b, and only the output of the inverter 23b becomes of L-level. At this time, the outputs of the inverters 24a and 24c through 24h are at H-level.

Similarly, in the case where, for example, the reproducing of sixth program is to be started, that is, in the case where the number of programs to be skipped over by fast-forward travel of the tape is five (5), the button 11 is pushed a total of five times. By this manipulation, a total of five clock pulses are successively supplied to the shift register 22. As a result only the output of the inverter 24e becomes of L-level, while the outputs of the inverters 24a through 24d and inverters 24f, 24g, and 24h become of H-level.

The output sides of the inverters 24a through 24h are respectively connected to the terminals on one side respectively of NOR gates 26a through 26h and, at the same time, are connected through resistors R21 through R28 to the cathodes of light-emitting diodes LED1 through LED8, respectively. These light-emitting diodes LED1 through LED8 are provided in correspondence respectively to display elements 15a through 15h for displaying numerals "1" through "8", respectively, shown in FIG. 1.

When the outputs of the inverters 24a through 24e successively become of L-level as described hereinabove, the light-emitting diodes LED1 through LED5 successively emit light, and the display elements 15a through 15e are successively lit. After the "SELECT" button 11 has been pushed five times, only the output of the inverter 24e continues to be at L-level, as long as the button 11 is not pushed again. For this reason, only the light-emitting diode LED5 continues to emit light, and only the display element 15e is lit and displays the numeral "5". During this operation, since the display elements 15a through 15h are successively lit every time the "SELECT"button 11 is pushed, the operator can select accurately and positively the number of programs to be set (i.e., the number of programs to be skipped over by fast-forward travel of the tape) as he watches the display elements and visually confirms that number.

Then, when a "PLAY" button 12 and a fast-forward "FF" button 13 are pushed, the reproducing apparatus is placed by a known mechanism into the tape fast-forward mode of operation, in which the pinch roller separates from the capstan, and the cassette tape is driven in fast-forward travel in the forward direction by the rotation of the takeup spool. At this time, the reproducing head is in contact with the tape and reproduces the signal recorded on the tape. However, the signal thus reproduced at the time of fast-forward operation is muted so that it is not produced as sound from speakers.

Figure 3:
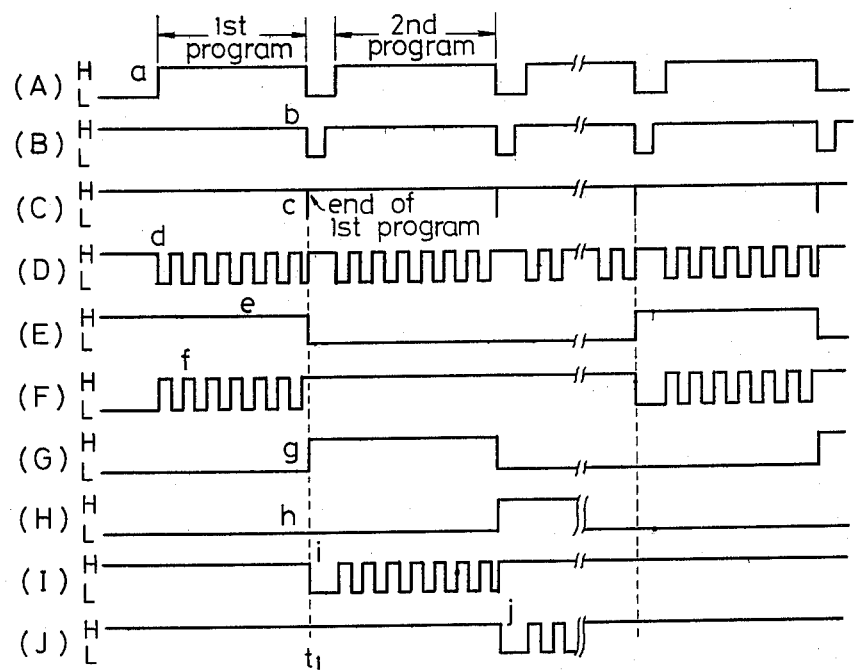
FIGS. 3(A) through 3(J) are respectively signal waveform charts for description of the operation of the circuit shown in FIG. 2.

The signal thus reproduced as the tape is driven in fast-forward travel is supplied to a known signal detection circuit (not shown). As a consequence, a detection signal of a waveform as indicated in FIG. 3(A) which assumes an H-level at parts of programs on the tape, that is, at parts wherein the reproduced signal continues to be exist, and assumes an L-level at the unrecorded parts where the signal is interrupted for a time exceeding a specific time is applied to an input terminal 27. This detection signal is then applied to one input terminal of a NAND gate 28 and, at the same time, is supplied by way of a capacitor C1 to a schmitt trigger circuit 29. The resulting output of the schmitt trigger circuit 29 is fed by way of a capacitor C2 to another schmitt trigger circuit 30. In the operational state prior to the start of the tape fast-forward travel, the input level of the input terminal 27 is an L-level, and the capacitor C1 is being charged by the positive voltage of the DC power source which is applied through a resistor R1. For this reason, the outputs of both of the schmitt trigger circuits 29 and 30 are at H-level.

When the operation assumes the above mentioned tape fast-forward mode, the detection signal applied to the input terminal 27 every time a program part of the tape is reproduced and detected becomes of H-level. This signal of H-level is applied to the NAND gate 28. As a result, an oscillation signal of low frequency (for example, of 3 Hz) from an oscillator 31 is passed through the NAND gate 28 and applied to one of the input terminals of each of NAND gates 32a through 32g and 32h. The waveform d of the output signal of the NAND gate 28 is indicated in FIG. 3(D). On the other hand, at the instant when the level of the detection signal applied to the input terminal 27 becomes H-level from L-level and during the period of its H-level, the outputs b and c of the schmitt trigger circuits 29 and 30 do not vary and remain at H-level as indicated respectively in FIGS. 3(B) and 3(C).

Next, when the unrecorded part of the tape between the first program and the second program is reproduced and detected, the detection signal applied to the input terminal 27 becomes one of L-level. At this time, the difference between the potentials of the two terminals of the capacitor C1 becomes substantially zero. For this reason, the input of the schmitt trigger circuit 30 assumes an L-level, and the output thereof also becomes of L-level. Thereafter the capacitor C1 is again charged by the power source voltage, and, until its potential exceeds the threshold voltage of the schmitt trigger circuit 29, the output b of the schmitt trigger circuit 29 is at an L-level as indicated in FIG. 3(B).

Here, the charging time constant of the capacitor C2 determined by the resistance value of a resistor R2 and the capacitance value of the capacitor C2 is selected at a value which is less than the charging time constant of the capacitor C1 determined by the resistance value of a resistor R1 and the capacitance value of the capacitor C1. For this reason, as indicated in FIG. 3(C), the output c of the schmitt trigger circuit 30 assumes an L-level only in a very short period from the instant at which the output b as indicated in FIG. 3(B) of the schmitt trigger circuit 29 becomes of L-level. Pulses of negative polarity from the schmitt trigger circuit 30 are applied as clock pulses to a shift register 33.

This shift register 33, which comprises cascade connected RS flip-flops 34a through 34h, writes in the H-level of the Q output of an RS flip-flop 35 when the above mentioned clock pulses become of L-level and sends out as output the data thus written in when these clock pulses return to the H-level. When one clock pulse arrives at the shift register 33, the output of an output terminal 36a assumes an H-level. At this time, the RS flip-flop 35 is reset, as a consequence of which, the shift register 33 is prevented from writing in anew the H-level.

As indicated in FIG. 3(E), the $\bar{Q}$ output $e$ of the RS flip-flop 35 is at an H-level from the instant at which the power source is turned on and the tape fast-forward travel is started to the instant t1 at which the unrecorded part between the first and second programs is detected. This H-level output is supplied to the other input terminal of the NAND gate 32h. When the tape fast-forward travel is started and the first program is being reproduced and detected, an oscillation output signal d as indicated in FIG. 3(D) which has passed through the NAND gate 28 is being applied to one input terminal of the NAND gate 32h. For this reason, the output f of the NAND gate 32h repeatedly alternates its level between H- and L-levels at the aforementioned frequency of 3 Hz as indicated in FIG. 3(F). The output side of this NAND gate 32h is connected via a resistor R10 to the cathode of a light-emitting diode LED0. Accordingly, this light-emitting diode LED0 intermittently emits light with the frequency 3 Hz, and the start "ST" display element 14 shown in FIG. 1 is intermittently lit, thereby indicating that fast-forward operation of the first program is being carried out.

Every time one clock pulse is sent from the schmitt trigger circuit 30 to the shift register 33, the H-level output shifts successively to the succeeding terminal from the terminal 36a to 36b and so forth. More specifically, when the fast-forward operation of the first program is completed, and the unrecorded part between the first and second programs is detected, a first clock pulse is applied to the shift register 33, and only the output of the terminal 36a assumes an H-level. Then, when the fast-forward operation over the second program is completed, and the unrecorded part of the tape between the second and third programs is detected, a second clock pulse is applied to the shift register 33, and only the output of a terminal 36b assumes an H-level. Similarly, when the fast-forward operation over the fifth program is completed, and the unrecorded part of the tape between the fifth and sixth programs is detected, a fifth clock pulse is applied to the shift register 33, and only the output of the terminal 32e assumes an H-level.

In the case where fast-forward tape travel past the eighth program is completed, and the eighth unrecorded part is detected, the output of a terminal 36h assumes an H-level, this output passes through an inverter 36 and a NAND gate 37 and is applied to the set terminal of the RS flip-flop 35. As a consequence, this RS flip-flop 35 is set, and its Q output terminal assumes an H-level state. The above described operation is repeated until the shift register 33 is cleared by a positive-polarity pulse received through an input terminal 38.

When, as described above, the fast-foward tape travel past the first program is completed at the instant t1, and the succeeding unrecorded part is detected, an H-level output g of a waveform as indicated in FIG. 3(G) is produced at the terminal 36a and is applied to the other input terminal of the NAND gate 32a. Then, since the signal d as indicated in FIG. 3(D) is being applied to the first mentioned input terminal of this NAND gate 32a, the NAND gate 32a produces an output i, which, after assuming an L-level during a period corresponding to the unrecorded period, repeatedly alternates between H-level and L-level, as indicated in FIG. 3(I). As a consequence, the light-emitting diode LED1 whose cathode is connected by way of resistance R11 to the output side of the NAND gate 32a intermittently emits light, and a display element 15a of the numeral "1" as shown in FIG. 1 is intermittently lit, thereby indicating that the fast-forward tape travel past the first program has ended, and the fast-forward tape travel over the second program is being carried out. Similarly, when the fast-forward tape travel part the second program is completed, an output h is produced at the terminal 36b and, as indicated in FIG. 3(H), assumes an H-level, and an output j is produced by the NAND gate 32b and becomes as indicated in FIG. 3(J). As a result, the light-emitting diode LED2 intermittently emits light, and the display element 15b of the numeral "2" is intermittently lit, thereby indicating that the fast-forward tape travel over the second program has ended, and that over the third program is in progress.

Similarly thereafter, when the fast-forward tape travel over the fifth program ends, and the succeeding unrecorded tape part is detected, the output of the terminal 36e becomes of H-level, and the output of the NAND gate 32e once becomes of L-level. The output side of this NAND gate 32e is connected by way of a resistor R15 to the cathode of the light-emitting diode LED5 and, at the same time, is connected to the other input terminal of the NOR gate 26e. Here, the first mentioned input terminal of this NOR gate 26e connected to the inverter 24e is at an L-level as a result of program selection by manipulation of the button 11 as described hereinbefore. Consequently, at the time when the fast-forward tape travel over the fifth program has ended, and the succeeding unrecorded tape part is detected, the two inputs of the NOR gate 26e both assume L-levels, whereby only the output of the NOR gate 26e assumes an H-level. The H-level output of the NOR gate 26e is applied via a resistor R3 to the base of a transistor Tr1, which thereby assumes its conductive state.

As a consequence of the transistor Tr1 thus becoming conductive, a solenoid driving circuit 39 operates to activate a solenoid 40, which thereupon operates to retract is plunger, whereby a mechanism (not shown) of the reproducing apparatus is changed over from the fast-forward mode to the normal reproduction mode of operation. Therefore, at the instant when the fast-forward tape travel over the previously selected number of programs (five programs in the present example) is completed, the operation of the reproducing apparatus is automatically changed over to the normal reproducing mode, and normal reproduction of the desired sixth program from its beginning part is started.

During the above described fast-forward tape travel successively over five programs, the display elements which are intermittently lit progressively increase in the order of 15a, 15b, 15c, . . . with respect to the program numbers of the programs over which the fast-forward tape travel has passed, and the growing line of intermittently lit display elements progressively approaches the display element 15e. Accordingly, the manner in which the fast-forward operation is progressing can readily be visually verified.

In the present embodiment of the invention, the resistance values of resistors R11 through R17 connected in parallel with the resistors R21 through R27, respectively, are selected to be lower than those of the resistors R21 through R27. For this reason, the brightness of the light during the light-emitting periods of the light-emitting diodes which emit light intermittently by alternately repeating on-off light emission as a result of the fast-foward mode is greater than the brightness of the light of the light-emitting diode which is lit in correspondence to the selected program. By this feature, the display by the light-emitting diodes which are intermittently emitting light can be verified even more clearly and positively.

Simultaneously with the start of normal reproduction, positive pulses are fed through an input terminal 38 and, passing through a diode D1, charge a capacitor C3. Until this accumulated charge is discharged through resistors R4 and R5, a transistor Tr2 assumes its conductive state. As a result of the conductive state of this transistor Tr2, the shift register 33 is cleared, and the RS flip-flop 35 is set through the NAND gate 37. As a consequence of the clearing of the shift register 33, the outputs of the terminals 36a through 36h all assume L-levels. By pushing a "CLEAR" button 16 on the front panel as shown in FIG. 1 thereby to close a switch 41, the stored information in the shift register 22 is cleared.

While, in the above described embodiment of the invention, the unrecorded parts of the tape between adjacent programs are detected to determine the beginning of the respective succeeding programs, in the case where a program-start signal is recorded on the tape at the point of beginning of each program, these program-start signals may be utilized.

Figure 4:
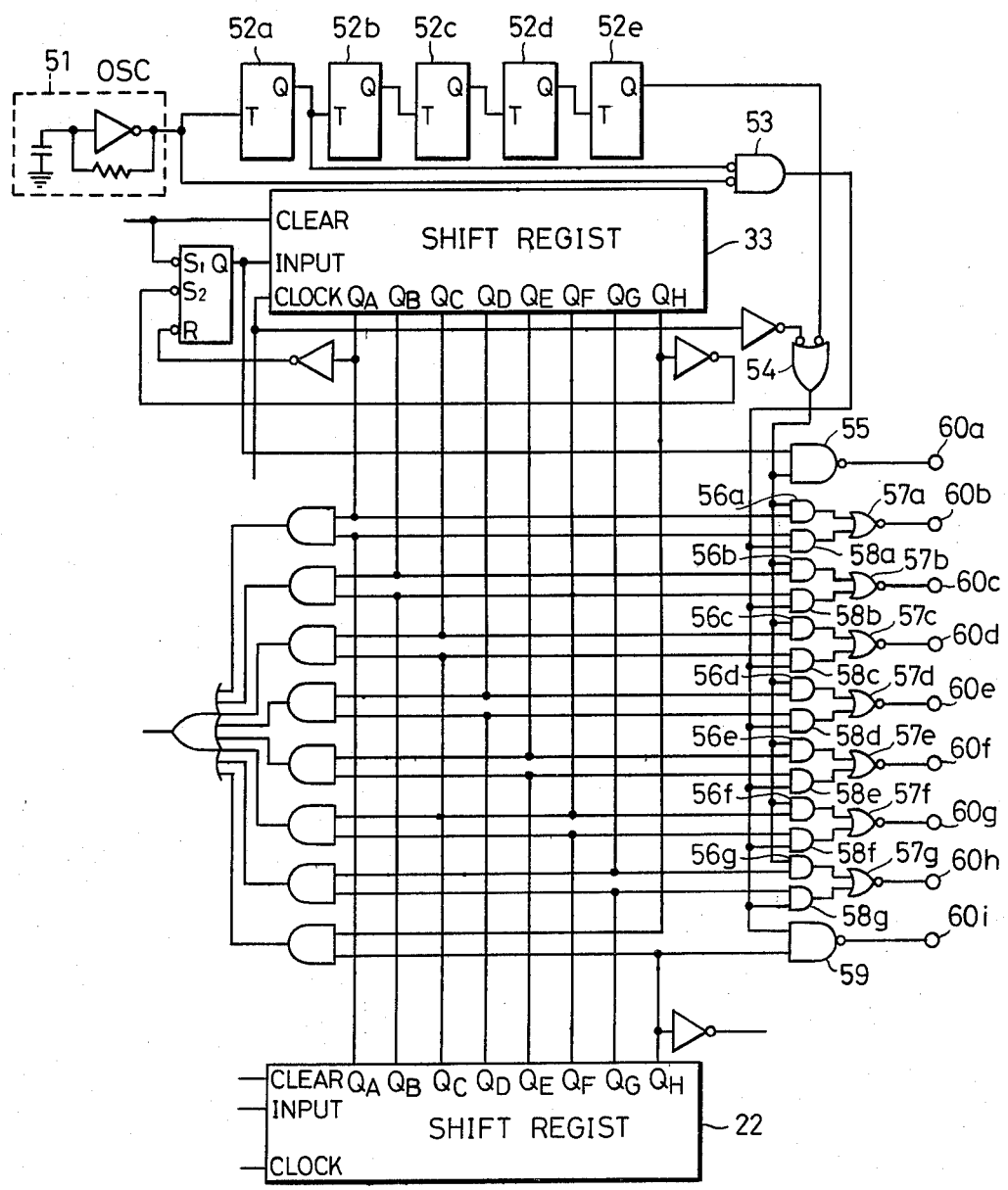
FIG. 4 is a circuit diagram of an essential part of another embodiment of the program-selecting device of the invention.

In the above described embodiment of the invention, the resistance values of the resistors R11 through R17 are made different from those of the resistors R21 through R27 in order to establish a difference between the brightnesses of the light-emitting diode for indicating the selected program and of the light-emitting diodes intermittently emitting light for indicating the progress of fast-forward operation. However, the present invention is not limited to such a circuit arrangement, it being possible to use a circuit organization as shown in FIG. 4 and described below.

In this circuit, constituting another embodiment of the invention, an oscillation signal from an oscillator 51 is successively frequency-divided by ½ by ½ frequency dividers 52a through 52e, finally being frequency divided by 1/32. The output signal of a frequency of the order of a number of Hz from the frequency divider 52e is passed through a NAND gate 54 and is applied to one of the input terminals of each of a NAND gate 55 and AND gates 56a through 56g. The other input terminals of the AND gates 56a through 56g are connected respectively to the output terminals of the shift register 33. The output of an AND gate, out of these AND gates 56a through 56g, which is being supplied with output of the shift register 33 is supplied to a corresponding NOR gate out of NOR gates 57a through 57g, whereupon a light-emitting diode connected to this NOR gate intermittently emits light.

On the other hand, the output of the oscillator 51 and the ½ frequency-divided output of the frequency divider 52a are fed respectively to a NOR gate 53, from which is produced as output a rectangular-waveform signal whose duty ratio has been caused to be 25%. This output of the NOR gate 53 is supplied to one of the input terminals of each of AND gates 58a through 58g and a NAND gate 59. The other input terminals of the AND gates 58a through 58g and the NAND gate 59 are respectively connected to the output terminals of the shift register 22. Accordingly, the above mentioned signal of reduced duty ratio is passed through that AND gate, out of the AND gates 58a through 58g and the NAND gate 59, which corresponds to the program number selected by the shift register and is applied to a NOR gate, and the corresponding light-emitting diode out of the light-emitting diodes connected to terminals 60a through 60i emits light of a brightness which is less than the brightness of the light emitted during the light emission period of the above mentioned light-emitting diode intermittently emitting light.

In the present embodiment of the invention, the brightness of the light emitted by the light-emitting diode which emits light can be suitably adjusted by appropriately selecting the above mentioned duty ratio. Another feature of the present embodiment of the invention is that the entire circuit thereof can readily be adapted to be made up of an integrated circuit (IC).

Further, this invention is not limited to these embodiments but various variations and modifications may be made without departing from the scope of the invention.

What is claimed is:

1. A program-selecting device in a reproducing apparatus having a fast-forward search speed and a normal playback speed for reproducing a selected program from a recording medium having a plurality of spaced programs recorded thereon, said program-selecting device comprising: a switch program selection which is manipulatively operated a number of times corresponding to
   the number of programs to be skipped over to reach the selected program;
   a memory circuit means for storing the number of times the switch is thus operated;
   a counting circuit means for detecting the parts between adjacent programs from the signal reproduced at the fast-forward search speed from the recording medium thereby to count the number of programs skipped over at the fast-forward speed;
   a comparison circuit producing a coincidence signal when the output of the memory circuit and the output of the counting circuit coincide;
   means operating in response to said coincidence signal to change the apparatus from the fast-forward search speed over to the normal playback speed to thereby play the selected program;
   display means comprising a set of display elements provided in a plural number corresponding respectively to the number of program numbers which can be selected, said display means activating the display element corresponding to the program number of the selected program to lite such; and
   lighting means activating the display elements corresponding to the counted skipped over programs as they are detected by the counting means to lite such in a mode different from the mode in which the display element corresponding to said selected program number is lit.

2. A program-selecting device as claimed in claim 1 in which the lighting means causes said display elements to be lit intermittently.

3. A program-selecting device as claimed in claim 1 in which the lighting means comprises an oscillator and means for supplying the output of the oscillator to the display elements.

4. A program-selecting device as claimed in claim 1 in which the lighting means causes the display elements to be lit intermittently with a brightness during periods of light emission which is greater than the brightness of the light of the display element corresponding to said selected program.

5. A program-selecting device as claimed in claim 1 further having a first set of a plurality of resistors respectively connected between the memory circuit and respective display elements and a second set of a plurality of resistors respectively connected between the lighting means and respective display elements and respectively having resistance values differing from those of the resistors of the first set.

6. A program-selecting device as claimed in claim 1 in which the lighting means comprises an oscillator, means for frequency-dividing the output of the oscillator, means for supplying the output of the frequency-dividing means to be display elements, means for decreasing the duty ratio of the output of the oscillator, and means for supplying the output of reduced duty ratio to the display element corresponding to the selected program.

* * * * *